Oct. 20, 1953    J. R. PERKINS, JR., ET AL    2,656,514
PULSE PRODUCING SYSTEM NETWORK
Filed Sept. 14, 1945    3 Sheets-Sheet 1

INVENTORS
JOSEPH R. PERKINS, JR.
STANLEY R. AMES

BY Ralph L. Chappell

ATTORNEY

Oct. 20, 1953     J. R. PERKINS, JR., ET AL     2,656,514
PULSE PRODUCING SYSTEM NETWORK
Filed Sept. 14, 1945     3 Sheets-Sheet 2

INVENTORS
JOSEPH R. PERKINS, JR.
STANLEY R. AMES
BY
Ralph L Chappell
ATTORNEY

Oct. 20, 1953          J. R. PERKINS, JR., ET AL          2,656,514
PULSE PRODUCING SYSTEM NETWORK
Filed Sept. 14, 1945                                                3 Sheets-Sheet 3

INVENTORS
JOSEPH R. PERKINS, JR.
STANLEY R. AMES
BY
*Ralph L Chappell*
ATTORNEY

Patented Oct. 20, 1953

2,656,514

UNITED STATES PATENT OFFICE 2,656,514

PULSE PRODUCING SYSTEM NETWORK

Joseph R. Perkins, Jr., Upper Montclair, N. J., and Stanley R. Ames, Rockland, Mass., assignors, by mesne assignments, to the United States of America as represented by the Secretary of the Navy Application September 14, 1945, Serial No. 616,404

2 Claims. (Cl. 333—23)

This invention relates to arrangements for the production of electric pulses of a desired form in a load of a given type and more particularly to circuits comprising reactive components of convenient physical dimensions and of a form which is easy to manufacture adapted to produce pulses of a desired form, amplitude and duration in a load of a given impedance after the occurrence of a suitable sudden change of state such as may be produced by a simple switching operation.

It has been found that by synthesis of a reactive network with regard to the transient response of such network, a solution may be obtained which approximates the desired form of pulse within a much smaller tolerance for a given number of reactive components than had been effected from previous considerations related to steady state analysis. The various forms in which networks may be designed in exact accordance with said solution are all somewhat difficult to manufacture. We have found that one of these forms, which employs capacitive elements of equal value and inductive elements of unequal value, may be approximated sufficiently closely for practical purposes by a form which employs capacitive elements all of which are of equal value and inductive elements of which all but two are of equal value.

This last-mentioned form permits the use of a simple tapped solenoidal coil for the inductive elements. It also permits the use of dielectrics such as paper. Oil paper condensers are cheap and easily manufactured in comparatively large sizes, but the Q is low and thus it was difficult to get good wave forms in a network of the Foster canonical form using all paper capacitors. In addition, it is somewhat more difficult to make the smaller capacitors values required for the higher antiresonant frequencies of that type of network. For these reasons, the development of types with equal capacitance per mesh (the types shown in Figures 16 and 17) was undertaken.

The slight departures from the positions of the theoretical antiresonant points which result from the simplification in coil construction are not serious. The ripples on the top of the wave are not in general of equal amplitude or spacing, but vary slightly from the wave form of Fig. 3; the wave form do, however, embody the main advantages of networks built in exact conformance with the theory, in that they do not violently varying amplitudes, the spikes shown in Fig. 2, or other marked discontinuities.

Accordingly, this invention has as its principal object to provide a network for simulating the reactive characteristics of a uniform transmission line, which network has all capacitances of equal value and all inductances except two of equal value.

For completeness, we shall review the theoretical development of the general solution given in U. S. Patent No. 2,461,321, issued February 8, 1949, to E. A. Guillemin, and of the particular form of network which employs capacitances of equal value. The development is best explained with reference to the drawings in which.

Figure 17:
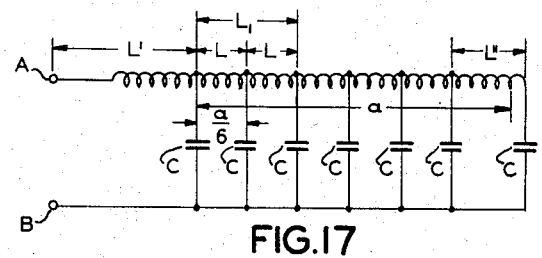
Fig. 17 is a schematic diagram of a network constructed in accordance with the present invention.
Figure 18:
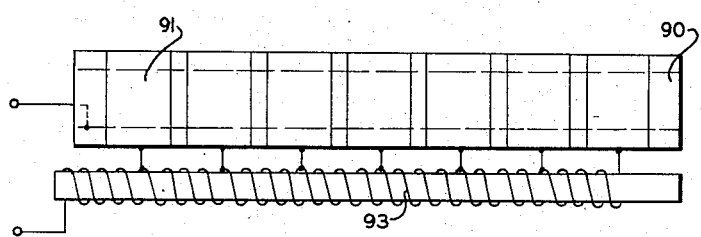
Figure 19:
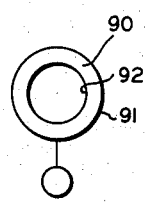
Figure 20:
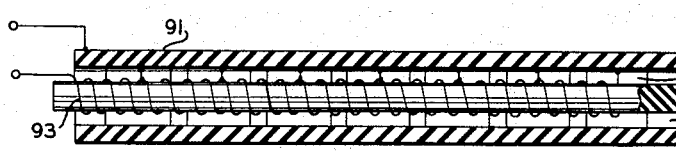
Figure 21:
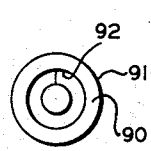

Figs. 18 and 19 show in side and end elevation respectively a possible form of physical construction for networks of the type of Fig. 17, and Figs. 20 and 21 show, in longitiudinal cross-section, and end elevation respectively, another possible form of physical construction for networks according to Figs. 18 and 19.

It is often desirable to provide, in an electric current, electric pulses in which the voltage and current suddenly rise from a fixed value such as zero to another fixed value, then remain at the latter value for a given period of time, usually a short period, and then suddenly fall again to the original value. Such a pulse may be described as a "rectangular" pulse because of the shape of the corresponding plot of voltage or current against time. Such pulses are particularly useful for the modulation or "keying" of high-frequency radio for intermittent short-period high-intensity operation. If the part of the circuit in which it is desired to produce the electric pulse, which part of the circuit may be regarded as the load, is a pure resistance or reasonably similar to a pure resistance, both the voltage and current waves have the same form. In practice, although the load provided by a transmitter designed to operate on intermittent high-intensity pulses usually differs appreciably from a pure linear resistance, satisfactory results in pulse-forming apparatus may be obtained by designing the apparatus as if the load were a pure resistance of generally equivalent value.

Figure 7:
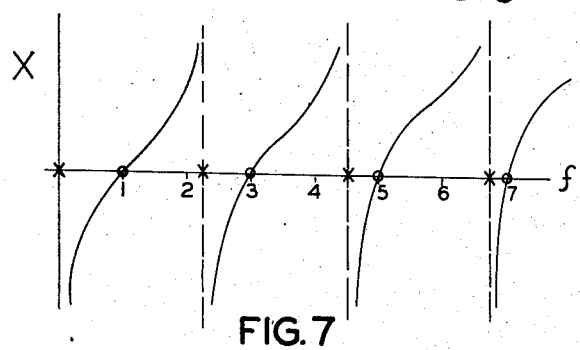
Fig. 7 is a theoretical diagram illustrating the reactance corresponding to a network such as that of Fig. 6 when the components are designed in accordance with the general solution of the previous invention.

This invention is concerned with providing the networks with reactance characteristics which have been found to be particularly well adapted for the production of rectangular pulses. The type of reactance characteristic with which the invention is concerned is shown in Fig. 7. This is a plot of reactance against frequency, the unit of frequency being related to the pulse length in the well-known way. Fig. 7 shows the reactance function of a 4-section (8-component) voltage-fed network, the crosses indicating poles of the function and the circles indicating zeros of the function. The characteristics of the network here concerned can be completely described, in accordance with electrical theory, by the disposition of the poles and zeros of the function (the other variable parameter, corresponding to the characteristic impedance, being varied to suit the particular circuit). It will be seen that in Fig. 7 the poles and zeros each form an arithmetic progression but that the spacing between the members of the two progressions is different, the spacing between the poles being slightly greater.

A formula has further been found which states to a close approximation the distribution of the poles and zeros which is found to be desirable. This formula, for the voltage-fed case, would put the zeros at values of frequency equal to $$\frac{1}{2\delta}, \frac{3}{2\delta}, \frac{5}{2\delta}, \frac{7}{2\delta}$$

and so on up to $$\frac{2n-1}{2\delta}$$

where $\delta$ is the pulse length and $n$ is half the number of reactive components (i. e. the number of inductances and also the number of capacitances). The poles will be at zero, infinity and $$\frac{2n}{2n-1}\cdot\frac{1}{\delta}, \frac{2n}{2n-1}\cdot\frac{2}{\delta}, \frac{2n}{2n-1}\cdot\frac{3}{\delta}$$

and so on up to and including $$\frac{2n}{2n-1}\cdot\frac{n-1}{\delta}$$

In the case of current-fed networks the poles correspond to the zeros of the corresponding voltage-fed networks, and vice versa. The drawings on the second sheet of drawings relate to the derivation of the networks and the demonstration of the significance of the above formulae. Tables of certain values worked out by the complete derivation of the networks are given in the specification, partly for direct use and partly for purposes of illustration.

Figure 1:
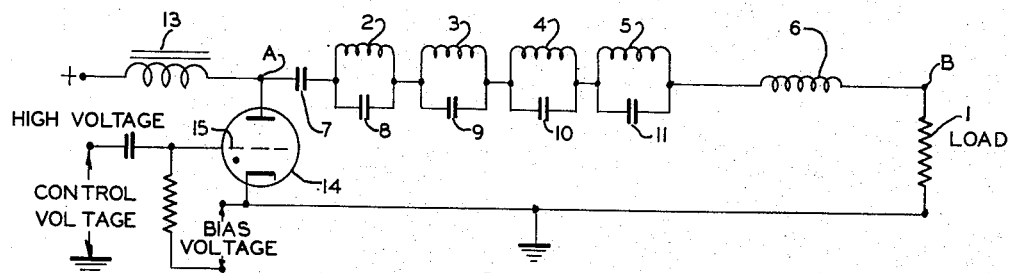
Fig. 1 is a circuit diagram of an apparatus for generating electric pulses in a load as a result of a simple switching operation.

Fig. 1 illustrates an arrangement of apparatus for producing rectangular electric pulses in a load 1, which is shown at the right as a resistance, it being understood that this representation of the load is quite general and that an electrical circuit which it is desired to operate by the pulses formed, such as the plate circuit of a radio transmitter, might be connected in the circuit in the place of the load. The part of the circuit shown in Fig. 1 between the points A and B constitutes a two-terminal reactant network the design of which is more fully described below. This network is made up of the coils 2, 3, 4, 5, and 6 and the condensers 7, 8, 9, 10, and 11. The network is connected to a high-voltage source through the choke coil 13. The other end of the network is connected to ground through the load. The high-voltage side of the network is connected to the anode of a gas discharge device 14, the cathode of which is connected to ground. The gas discharge device 14 acts as an electronic switch and has a control electrode 15 which is adapted to be connected to bias and control voltages in the usual manner. When the gas discharge tube 14 is non-conducting, the condenser 7 of the network will be charged by the aforesaid high voltage. The choke 13 is preferably made of such size that it resonates with the condenser 7 at the frequency at which the network is charged and discharged. The inductances 2, 3, 4, 5 and 6 may be left out of account because they are small compared to the inductance of the choke coil 13. The proper choice of the magnitude of the choke 13 enables the condenser 7 to be charged to a higher voltage for a given supply voltage. When, by a suitable change of control voltage, the discharge device 14 is suddenly made conducting, the electrical energy stored in the network will discharge through the load 1 and the discharge device 14. The network design will determine the duration and form of the discharge. If the network were a parallel-conductor transmission line of suitable characteristic impedance and of a length $x$, open at one end and connected at the other end to the points A and B, and if the said transmission line had negligible dissipation, the discharge would be in the form of a rectangular pulse of a voltage equal to half that to which the line was charged and of a duration equal to $$\frac{2x}{c}$$

where $c$ is equal to the velocity of light. For a one microsecond pulse, such a transmission line would have to be 150 meters long, an inconveniently large structure. Instead of the transmission line, which is a circuit having distributed reactances, networks of lumped reactances may be provided which when inserted between the points A and B of Fig. 1 and excited and triggered as aforesaid, will produce a pulse which approximates the desired rectangular pulse. The network shown in Fig. 1 between the points A and B is a general representation of such a network and may, for instance, be a network designed in accordance with this present invention as explained below. Networks have been known which from the point of view of steady-state analysis and behavior closely approximate the properties of a transmission line for a given range of frequencies. In general, such networks, which are often called "artificial lines," when used to approximate the square pulse response, result in an approximation of the Fourier type, such as is shown diagrammatically in Fig. 2. It is an object of this treatment to avoid this type of approximation because of certain inherent disadvantages thereof presently to be discussed and to proceed instead upon a new approach in which the transient response of the component is the chief consideration.

In the Fourier analylsis of a single rectangular pulse, certain well-known expressions result which give a series of terms representing components of such a pulse having different frequencies and amplitudes, the frequencies and amplitudes being given by these various expressions. At frequencies higher than a certain frequency which is related to the pulse duration, the amplitudes of the higher-frequency components are generally smaller than the amplitude of the lower-frequency component (for although the curve determining these amplitudes oscillates, the maxima of such oscillation decreases with frequency). Thus if a given network is progressively modified to approximate the characteristics of a transmission line over an increasing range of frequencies from zero up to some limit frequency, the deviation from the rectangular pulse form, when the network is connected as in Fig. 1 will be progressively smaller as the frequency of the lowest-frequency component outside the range of approximation becomes higher.

The excitation of the network being essentially a "step wave" (a D. C. switching effect), which may be regarded as containing all frequencies up to a high limit determined by the steepness of the "step," the network needed to form a rectangular pulse response should be able to respond at suitable relative amplitudes to the frequencies needed to form the pulse of the desired length, and should preferably not respond at other frequencies.

Figure 2:
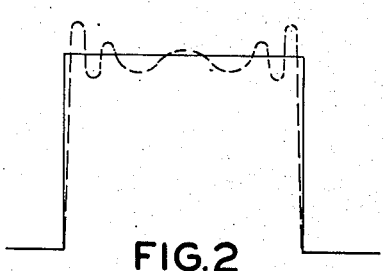
Figs. 2 and 3 are diagrams showing different ways in which a pulse of square form may be approximated.

A network of a finite number of lumped reactances has a finite number of resonance frequencies, as distinguished from a distributed reactance circuit such as a transmission line which has an infinite number thereof. The network approximation of a transmission line must, therefore, neglect some of the frequency components of the functions in question and in general it is preferable to neglect the higher-frequency components because of their small amplitudes. The type of approximation of a square pulse obtainable by combining the lower-frequency components at the amplitudes prescribed by the coefficients of a Fourier series and by neglecting the nature of the response at higher frequencies is shown in a general manner in Fig. 2. The solid line represents the desired square pulse and the dotted line represents the actual type of pulse resulting where the pulse-forming network fails to respond to the higher-frequency components of the exciting step wave. The ripples in the top of the pulse as shown in Fig. 2 are symmerical about the center, since it is assumed that the network has negligible dissipation. In actual apparatus the initial overshoot and the ripples in the initial part of the pulse will be more prominent than the succeeding ripples, and in addition the amplitude of the pulse may decrease with time because of the existence of losses in the network. For purposes of illustration of the principles of the present invention, however, it is more convenient to consider the phenomena occurring in the absence of dissipation, since the presence of dissipation merely involves a fairly simple modification of the representation of said phenomena, as is well understood.

As an increasing number of the resonance frequencies of the previously considered transmission line are represented in the network, beginning with the lower frequencies and progressing toward the higher frequencies, the number of ripples in the response pulse, shown by the dotted line in Fig. 2, increases and the amplitude of the ripples decreases except that the initial "overshoot" is not much decreased in amplitude, although it is reduced in duration. When the response approaches the desired square pulse, especially in the manner in which a Fourier series approaches a square function with the addition of successive terms, the maxima nearest the corners of the pulse are relatively high and in general the ripples are larger and sharper towards the edges of the pulse and lower and smoother in the center of the pulse. A higher degree of approximation following this approach will reduce the magnitude of the ripples but will not affect this peculiar distribution of ripple amplitudes.

For practical purposes the merit of an approximation of a square pulse may be referred to the maximum deviation from the desired shape rather than on the integrated deviation over the whole period of the pulse. Thus, in simple terms, the type of approximation shown in Fig. 2 is undesirable because of the relatively large deviation from the desired pulse forms near the corners of the pulse, irrespective of the high degree of approximation towards the center of the pulse which does not, for practical purposes, compensate for the aforesaid high deviation at the corners. Some approach is, therefore, desirable which does not proceed by simply simulating the reactance of a line at higher and higher frequencies by increasing the number of components while keeping the network in the form of a series of identical sections.

The invention enables one to determine the constitution of a network which when excited by a step wave, as, for instance, in the circuit of Fig. 1, will produce a response which is an approximation of a rectangular wave in which the various points of maximum deviation from the desired pulse form are substantially equal so that the maximum deviation or "tolerance" may be quite small although no great precaution is taken to reduce the integrated deviation over the period of the pulse. When a network is constructed on this approach on the basis of the analysis of transient response, a great improvement in the reduction of the tolerance may be achieved for a given number of reactive components in the network as compared with the network which approaches the desired response after the matter of a Fourier series as hereinbefore outlined.

Figure 3:
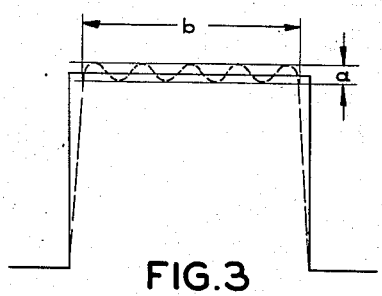

The type of response which is designed to exhibit a minimum tolerance for a given number of components is shown in Fig. 3, the dotted line representing the response in question and the solid line representing the rectangular pulse which it is desired to approximate. The total amplitude of the ripple, which is twice the tolerance, is shown by the dimension $a$. The period within which the tolerance in question is maintained is shown by the dimension $b$, which is sometimes referred to as the "coverage." The approach to a rectangular pulse by a wave of this form with an increasing number of network components is more rapid than an approach by a wave of the form of Fig. 2 because the addition of components in the case of Fig. 2 goes partly to reduce the amplitude of the already small ripples in the center, whereas if each time components are added the network is redesigned to maintain the type of approximation shown in Fig. 3, maximum tolerance-reducing advantage is taken of the new component.

In order to explain the construction of networks to produce rectangular pulse approximations of the forms show in Fig. 3, it will be convenient to refer first to transient phenomena and simple networks. It is to be understood that the diagrams of Fig. 2 and Fig. 3 are illustrative rather than mathematically accurate, the ripples being somewhat magnified in order that their character may be readily apparent.

Figure 4:
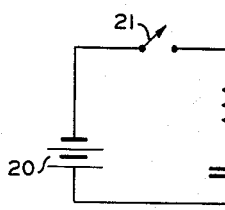
Figs. 4, 4A and 5 are circuit diagrams for the illustration of certain principles upon which the invention depends.

In Fig. 4 is shown a simple circuit in which are connected in series a battery 20 of a given voltage E, a switch 21, an inductance 22 and a capacitance 23. It is assumed that there is no dissipation in the circuit. If the circuit is suddenly closed by means of the switch 21 (assuming the condenser 23 to have been in a discharged condition before the circuit was closed) the current flowing in the circuit will be given by the expression $$i(t) = E\sqrt{\frac{C}{L}} \sin \sqrt{\frac{t}{LC}} \qquad (1)$$

In the above expression the sine factor indicates a frequency and the $$E\sqrt{\frac{C}{L}}$$

factor gives its amplitude. Thus, if the losses in the circuit are zero, a sine wave will be produced the amplitude of which remains constant.

Figure 4A:
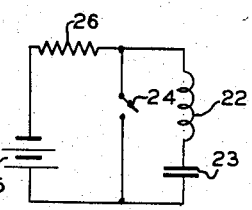

Fig. 4A shows a circuit similar to Fig. 4 with the modification that the circuit is arranged to produce a sinusoidal oscillation upon the discharge of the reactive network instead of upon charging of the network. Instead of the switch 21 provided in Fig. 4 for the application of voltage to the network, the switch 24 is provided in Fig. 4A for suddenly short-circuiting the terminals of the network and causing it to discharge. In order to protect the voltage source 25 against damage resulting from being short-circuited, a high resistance 26 is provided in series with the source 25. When the switch 24 is suddenly closed a current will flow which is given by the above equation and if there are no losses in the circuit the oscillations will continue undamped.

Figure 5:
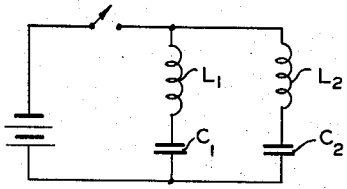
Figure 6:
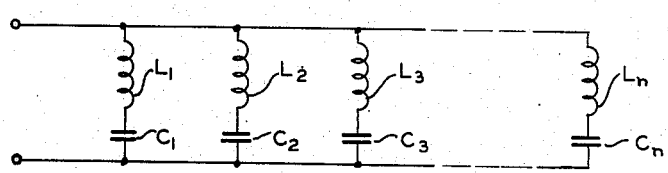
Fig. 6 is a schematic diagram of one form of reactive network in accordance with the general solution of the previous invention.

Now if instead of the coil and condenser either in Fig. 4 or in Fig. 4A a lossless transmission line open-circuited at the far end were connected, a square wave will be obtained the period of which is related to the length of the transmission line in the well-known way, namely $$t = \frac{2S}{c}$$

where $t$ is the period, S the length and $c$ the velocity of light. Since it is known that a square wave may be approximated by the superposition of sinusoids of suitable periods and amplitudes, it is apparent that the reactance of the transmission line may be approximated in circuits similar to Fig. 4 and Fig. 4A by providing parallel combinations of networks such as those shown in those figures. Fig. 5 shows a parallel combination of two such networks in a circuit similar to Fig. 4 and Fig. 6 illustrates a parallel combination of $n$ such networks adapted to be inserted in a circuit such as Fig. 4 or Fig. 4A.

In connection with Fig. 5 it will be seen that insofar as the effect on the current flowing when the switch is closed are concerned, the effect of the network $L_1C_1$ and $L_2C_2$ will be simply additive. The response to the switching operation will be a combination of two sine waves the frequencies of which correspond respectively to the series-resonant frequencies of the combination $L_1C_1$ and $L_2C_2$ respectively and the amplitude of the two component oscillations will be respectively $$E \cdot \sqrt{\frac{C_1}{L_1}} \text{ and } E \cdot \sqrt{\frac{C_2}{L_2}}$$

As previously suggested, not all approximations of square waves by the superposition of sine waves are equally good. In this regard the problem of approximating a single square pulse such as may be formed by discharging a lossless transmission line through a resistance equal to its characteristic impedance is analogous to the problem of approximating a continuing square wave such as may be formed by discharging such a transmission line through a short circuit, both these problems being essentially the problem of simulating the reactance characteristics of a lossless transmission line. It is desired to obtain an approximation of these reactance characteristics which avoid excessive "overshoot" in the neighborhood of the discontinuity of the square wave which it is desired to approximate, and it is desired to achieve the approximation with the smallest possible number of reactive components. The nub of the problem with which this invention is concerned is therefore the determination of the desired frequencies of oscillation which should be provided by the network and the desired relative amplitudes at which these frequencies should be provided, and then to calculate, from such data and from the load impedance into which it is desired to operate the network, the magnitudes of the inductances $L_1$, $L_2$ ... $L_n$ and the capacitances $C_1$, $C_2$ ... $C_n$. In the circuit of Fig. 6 the products $L_1C_1$, $L_2C_2$ ... $L_nC_n$ will determine the resonant frequencies and the quotients $$\frac{C_1}{L_1}, \frac{C_2}{L_2} \cdots \frac{C_n}{L_n}$$

will determine the relative amplitudes of the component frequencies.

When it is desired to connect a load in the circuit to utilize the network response, it is important that the impedance of the load (that is, its voltage-current characteristics) should be such that the load can pass currents of the magnitude of those furnished by the network at the voltages impressed across the load by the network. Once a network of a desired reactance characteristic has been worked out corresponding networks for working into various load impedances may be designed simply by adjustment of all the $$\frac{C}{L}$$

ratios together, as hereinafter more fully explained.

The task of obtaining the type of approximation of a rectangular pulse response which is shown in Fig. 3, the advantages of which have been previously described, is simplified by the symmetrical form of the rectangular pulse which suggests that the desired resonance frequencies for the network of the form of Fig. 6 are the harmonics (including, of course, the fundamental, which is the first harmonic) of a frequency determined by the desired pulse length in accordance with the relation $$f = \frac{1}{2\delta}$$

where $f$ is the frequency in cycles per second and $\delta$ is the pulse length in seconds.

In practice five of these frequencies, combined in the proper amplitudes, are able to form a response which approaches the desired rectangular pulse within a tolerance sufficiently small for useful purposes. Closer approximation may be obtained by including a larger number of resonant frequencies in the network. As is apparent from Fig. 6 the number of resonant frequencies bears a direct proportion to the number of reactive components in the network, being half the latter number.

From the above-noted facts concerning the resonant frequencies which the desired network may be expected to have, the conclusion may be drawn that what is required in order to furnish the desired type of approximation of a square wave (and finally, of a square pulse when the network is used to work into a resistance of the proper value) is a suitable modification of the values of the coefficients of the Fourier series approximation, the periodicity of the respective terms of the series being in this case unaltered. Since the difficulty with usual Fourier series approximations of a square wave or a square pulse, as illustrated in Fig. 2, occurs chiefly in the neighborhood of the corners of the wave, which is to say in the neighborhood of the discontinuities in the waves, it may be expected that if one atempts to approximate a curve which is less discontinuous in character, but still sufficiently similar to the square wave for practical purposes, a Fourier series approximation might be found which converges more rapidly in the neighborhood of the corners of the wave.

Figure 8:
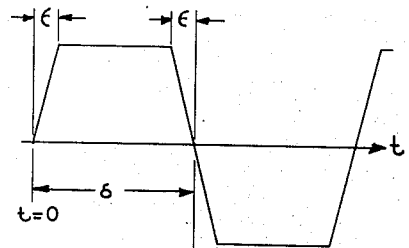
Figs. 8 and 9 are theoretical diagrams illustrating certain principles of the invention.

Instead of setting up a Fournier series to approximate a square wave, then, a trapezoidal type of wave, such as that shown in Fig. 8, may be considered. The rate of rise and fall in such a wave is no longer infinite, although it is quite steep. The time required for the rise, which is equal to the time for the fall is denoted by the value $\epsilon$. The function represented in Fig. 8 exhibits no discontinuity and its Fourier series converges more rapidly than that for the square wave functions, but for small values of $\epsilon$ the partial sum of this series still exhibits a tendency to overswing, although considerably less than is observed in the case of the square wave. Further reduction of the tendency to overswing in the neighborhood of the corners of the wave may be accomplished by considering a wave of a smoother sort. Mathematically the concept of smoothness involves absence of discontinuity not only in the function itself but in the derivatives of the function. Thus although the wave considered in Fig. 8 has no discontinuities, it does have a discontinuity in the first derivative. If a curve were substituted in which the first derivative is continuous, the Fourier series may be expected to converge more rapidly, and the provision of a curve in which not only the first derivative but also the second derivative exhibits no discontinuity may be expected to result in even more rapid convergence of the Fourier series. For practical purposes, sufficient improvement in the convergence of the Fourier series is obtained by providing a form of wave having no discontinuities in the first derivative as well as in the function itself, without considering the second and higher derivatives.

Figure 9:
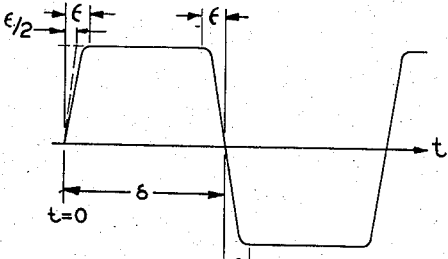

As noted in connection with Fig. 3, some overswinging can be tolerated provided the oscillatory deviation maintains an approximately constant amplitude over the constant portions of the function which is being approximated. It appears, therefore, that one may choose an approximating function of the form shown in Fig. 9. Here the rising portions of the functions are parabolic arcs, the apex of each arc joining smoothly with the adjacent constant portion. The time of rise is again denoted by $\epsilon$. It is interesting to observe that the slope at the points where the function passes through zero is such that the tangent drawn at these points intersect the final value after the time increment $$\frac{\epsilon}{2}$$

as shown on Fig. 9.

The coefficient of the sine terms in the Fourier series for this wave are found to be given by $$a_k = \frac{4}{k\pi}\left(\frac{\sin\left(k\frac{\pi}{2}\frac{2\epsilon}{\tau}\right)}{k\frac{\pi}{2}\frac{2\epsilon}{\tau}}\right)^2 \qquad (2)$$

in which $\tau$ is the period of the approximating function of Fig. 9 although for the limit $\epsilon \to 0$ this result coincides with the corresponding one for the square wave, as might be expected. For large $k$ the coefficients given by the above expression are proportional to $$\frac{1}{k^3}$$

while those for the square wave vary as $$\frac{1}{k}$$

Hence the series for the approximating function of Fig. 9 converges considerably more rapidly than that for the square wave, provided $\epsilon$ is not too small.

At this point a choice is to be made for the value of $\epsilon$, based upon a compromise between a desired rate of rise and a simultaneous desire to keep the total number of network elements to a minimum. Assuming that one wishes to limit the network to five series-resonant circuits (this limits the series to five sinusoidal terms), a satisfactory solution can be arrived at after several trials. The pulse duration obtained with the network, heretofore denoted by $\delta$, is recognized to be one-half of the period $\tau$, so that the expression for the coefficients of the series may be written as follows:

$$a_k = \frac{4}{k\pi}\left[\frac{\sin\left(k\frac{\pi}{2}\frac{\epsilon}{\delta}\right)}{\left(k\frac{\pi}{2}\frac{\epsilon}{\delta}\right)}\right]^2 \qquad (3)$$

The rate of rise is conveniently expressed by the ratio $$\frac{\epsilon}{\delta}$$

For the choice of $$\frac{\epsilon}{\delta} = 0.12$$

one finds the coefficient values

| $a_1$ | $a_3$ | $a_5$ | $a_7$ | $a_9$ | $a_{11}$ |
|---|---|---|---|---|---|
| 1.252 | 0.380 | 0.187 | 0.0978 | 0.0479 | 0.0269 |

Assuming that one wishes to limit the series to five terms, this looks like a reasonable compromise since the last coefficient, $a_{11}$, is only about 2% of the fundamental, $a_1$, and hence negligible if a 2% ripple can be tolerated.

Upon drawing the resultant curve for five sine terms with the coefficient $a_1$ to $a_9$ of the above table one finds this conclusion approximately substantiated. Some further slight modifications in the coefficient values (determined by trial) are, however, found to further improve the situation with regard to making the maximum values of the oscillatory deviation equal. The resulting coefficient values are found to be

| $a_1$ | $a_3$ | $a_5$ | $a_7$ | $a_9$ |
|---|---|---|---|---|
| 1.2575 | 0.3925 | 0.1735 | 0.0832 | 0.0502 |

These are accepted as a solution to the five elements network problem.

According to Equation 1 one then has for the element values $$a_k = \sqrt{\frac{C_k}{L_d}}; \quad \sqrt{L_k C_k} = \frac{\tau}{2\pi k} = \frac{\delta}{\pi k} \quad (4)$$

or $$C_k = \frac{\delta}{\pi k} a_k; \quad L_k = \frac{\delta}{\pi k} \frac{1}{a_k} \quad (5)$$

For $\delta = \pi$ seconds, these reduce to $$C_k = \frac{a_k}{k}; \quad L_k = \frac{1}{a_k k} \quad (6)$$

The network with these parameter values yields a transient current wave (for an applied unit step voltage) with unit amplitude. That is, it simulates a transmission line having a characteristic impedance of 1 ohm. To change this design to an R ohm level, the inductance values in Equation 5 are multiplied by R and the capacitance values are divided by R. The inductance and capacitance values given by Equation 6 are, then, to be multiplied respectively by $$\frac{R\delta}{\pi} \text{ and } \frac{\delta}{\pi R}$$

to make them appropriate to a network having an R ohm impedance level and a pulse duration of $\delta$ seconds.

The subscripts of the coefficient $a$ given in the above table do not correspond with the numbering of the elements shown in Fig. 6, but instead with the order of the harmonics of the fundamental frequency $$\frac{1}{2\delta}$$

represented by the terms of which the quantity of $a_k$ are the coefficients.

The magnitude of the elements for a network of the type shown in Fig. 6 having five series-resonant circuits calculated from the Formulae 6 are given in the following table, the subscript numbering of the elements being in accord with the notation of Fig. 6 instead of with the subscripts of the coefficients of the Fourier series. The inductances are given in henries and the capacitances are given in farads, the network being designed, as above indicated, for a pulse length of $\pi$ seconds and a characteristic impedance of 1 ohm. In practice very much shorter pulse lengths are desired and somewhat higher characteristic impedances are used, so that the above-mentioned relation for obtaining a network for other pulse lengths and other impedances is normally used. The pulse length of $\pi$ seconds and a network impedance of 1 ohm is a convenient reference standard because its relation to the units involved.

*Table I*

| $L_1$ | $L_2$ | $L_3$ | $L_4$ | $L_5$ |
|---|---|---|---|---|
| 0.795 | 0.849 | 1.1525 | 1.7175 | 2.325 |
| $C_1$ | $C_2$ | $C_3$ | $C_4$ | $C_5$ |
| 1.2575 | 0.1308 | 0.0347 | 0.011875 | 0.00531 |

A network of the form shown in Fig. 6 will necessarily possess an anti-resonant frequency between each pair of consecutive resonant frequencies which is to say that the reactance function of the network will, as is well known, have a pole between each pair of consecutive zeros. In order to investigate the location of these anti-resonant frequencies for networks designed in accordance with the present invention, it is desirable to consider in a general way an alternate method for deriving the coefficients of a Fourier series which will serve to define the network, this time in terms of the anti-resonant frequency of the network. Then, by combining the results obtained from such investigations with the previously described result, it is possible to provide a more rapid method of obtaining the desired constants for a network of any desired number of components which avoids the necessity of the extensive calculations required in the type of derivations just outlined.

Figure 10:
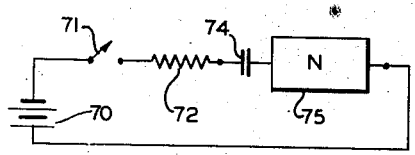
Fig. 10 is a diagram of a circuit to be considered in connection with the explanation of the invention and Fig. 11 is a diagram of certain conditions in the circuit of Fig. 10.
Figure 11:
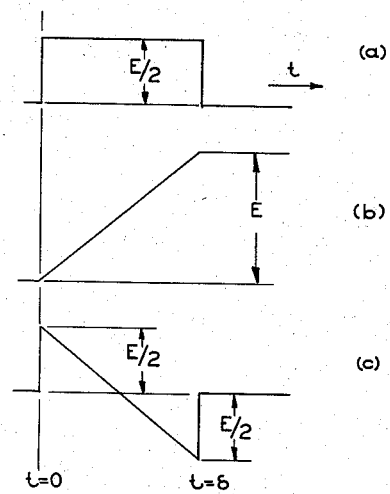

For this further investigation, the circuit of Fig. 10 should be considered. In Fig. 10 is shown a source of voltage (the battery 70), a switch 71, a resistance 72, and a reactive network including, in series, the condenser 74 and the subsidiary network N. If now it is desired by suddenly closing the switch 71 and thereby introducing the voltage E into the circuit, to cause a single rectangular pulse of current to flow in the resistance R, the corresponding voltage condition across the resistance 72, across the condenser 74 and across the network N will be represented respectively by the curves (a), (b), and (c) of Fig. 11. As required by hypothesis, the sum of these curves is a step wave of voltage, the voltage being equal to zero for $t<0$ and being equal to E for $t>0$. The amplitude of the rectangular pulse shown at (a) is $E/2$. The voltage curve (c) of Fig. 11 is a single oscillation of a saw-tooth wave, going from $+E/2$ to $-E/2$.

Figure 12:
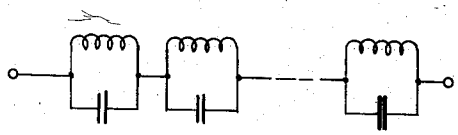
Fig. 12 is a diagram of the form of the network N of Fig. 10 as suggested from observation of Fig. 11.

It is known that if a constant current I is suddenly impressed upon a simple anti-resonant combination consisting of an inductance and capacitance in parallel, the resulting transient voltage drop is given $$e(t) = I\sqrt{\frac{L}{C}} \sin \frac{t}{\sqrt{LC}} \quad (7)$$

the periodic saw-tooth wave may be approximated by a finite sum of sine terms such as the right-hand side of Equation 7, so that the resultant network N may assume the form shown in Fig. 12, in which each anti-resonant component places one sine term in evidence.

The above considerations serve to give a general indication of the form of network in question, but in order to obtain the desired type of reactance function, the notion of approximating a square wave is to be modified as before, by the concept of approximately a trapezoidal network response, admitting a finite rate or rise in the increment $\epsilon$. For this purpose the circuit of Fig. 13 should be considered. This corresponds to the circuit of Fig. 10 except that an inductance 76 has been added in series with the other reactive components. The subsidiary network is shown at N'. As will presently be shown, the inductance 76 is necessary for obtaining the trapezoidal form of response, and although it might be considered as being part of the network N', it is shown separately in order that the network N' may have the form of Fig. 12. The entire reactive network the design of which is here being considered consists of the capacitance 74, the subsidiary network N' and the inductance 76.

Figure 14:
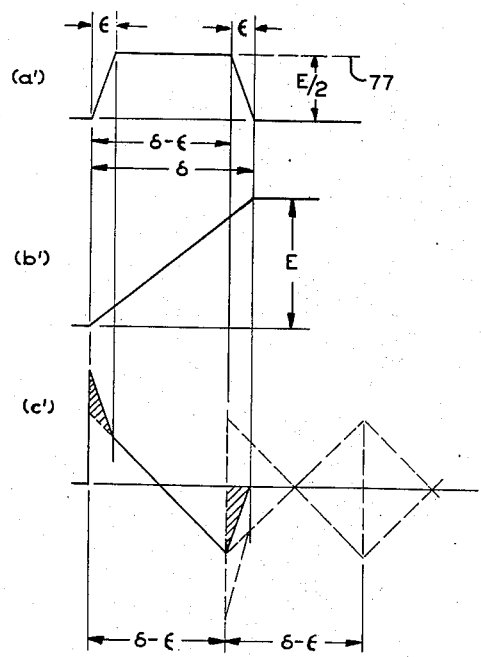
Fig. 13 is a diagram of another circuit to be considered in connection with the explanation of the invention and Fig. 14 illustrates conditions occurring in the circuit of Fig. 13.
Figure 13:
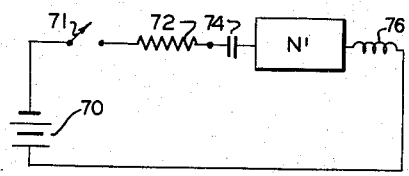

The conditions to be produced in the reactive network of Fig. 13 are shown in Fig. 14. Curve (a') of Fig. 14 represents the voltage across the resistance 72. Since a trapezoidal current pulse beginning when the switch 71 is closed at the time $t=0$, the voltage across this resistance will be trapezoidal as shown in the curve (a'') and the amplitude will be $$\frac{E}{2}$$

since it is desired that the voltage should divide between the resistance and the network.

It will be noted that the trapezoidal pulse shown in the curve (a') may be considered as made up of two step waves, each having a slanting front edge, the first being a positive step wave including the left-hand edge of the trapezoidal pulse and continuing as shown by the dotted line 77, and the second being a negative step wave including the right-hand edge of the trapezoidal pulse and continuing thereafter along the axis of abscissae. The interval between the two step waves is not $\delta$ but $(\delta-\epsilon)$. The curve (b') indicates the voltage in the condenser 74. It will be noted taht this voltage reaches a substantially constant value at the time $(\delta-\epsilon)$.

The diagram (c') represents the voltage drop which the network N' and the inductance 76 should provide so that the total voltage in the circuit exclusive of that provided by the battery 70 will be equal to E after the closing of the switch 71 at the time $t=0$. The shaded portions of the diagram (c') represent the effect of the inductance 76. It will be seen that if the shaded portions are left out of account, the rest of the diagram (c') is made up of two sawtooth waves each having a period of $(\delta-\epsilon)$, one beginning at $t=0$ and the other beginning at $t=\delta-\epsilon$. Each of these waves correspond to one of the step waves making up the diagram (a'). These sawtooth waves cancel each other at all times after $t=\delta-\epsilon$, so that the resultant oscillation is a single sawtooth oscillation. It is now seen that in order that the voltage across the network N' may be represented by a sawtooth oscillation, so that the network N' may be provided in the form shown in Fig. 12, it is necessary to add the inductance 76 in series in order to provide the addition to the voltage curve of the diagram (c') represented by the shaded areas, so that the total voltage in the circuit will satisfy the necessary condition heretofore stated.

From this point the procedure may be refined by substituting a smoother curve for the trapezoids shown in the diagram (a'), then by choosing a suitable value of $\epsilon$ in terms of $\delta$, trying out this value and, if necessary, redefining $\epsilon$, as before. This scheme of calculation of the components of the network is less convenient than that previously derived for the type of network shown in Fig. 6, it being difficult to obtain a suitable value for the inductance 76, but since the network shown in Fig. 13 is related to that of Fig. 6, by well-known network transformation theorems, both networks having identical reactance functions, the exact values for the components of the type of network shown in Fig. 13 which is incidentally the same type of network as that shown in Fig. 1, may be obtained from the values derived in connection with Fig. 6.

The utility of the above investigation of Fig. 13 lies in the fact that the curve (c') of Fig. 14 shows that the periodicity of the saw-tooth wave which is to be approximately by concatenation of parallel resonant circuits is $(\delta-\epsilon)$ and not $\delta$, which is to say that the anti-resonant frequencies of the network will be harmonically related not to $\delta$, but to $(\delta-\epsilon)$. Since the networks of Fig. 13 and that of Fig. 6 have the same reactance functions for the same number of components, the anti-resonant frequencies of the network of Fig. 6 will be the same as those just derived in connection with Fig. 13.

From a further consideration of the results brought out in connection with Figs. 13 and 14 it is possible to obtain an expression for the anti-resonant frequencies in terms of $\delta$ and the number of reactive components in the network, which is $2n$, $n$ being the number of resonant frequencies. Thus the periodic current wave corresponding to the trapezoidal pulse shown in Fig. 14 is approximately given by the following partial sum of a Fourier series:

$$i(t)=\frac{4}{\pi}\left(\sin \omega t+\frac{1}{3}\sin \omega 3t+\ldots+\frac{1}{n}\sin n\omega t\right)$$

whence $$\left(\frac{di}{dt}\right)_{t=0}=\frac{4}{\pi}(\omega+\omega+\ldots+\omega)=\frac{4n\omega}{\pi}=\frac{4n}{\tau/2}=\frac{4n}{\delta}$$

Letting the rising part of the trapezoid be given by the tangent to the $i(t)$ curve at $t=0$, rounding the top of the rising part as in Fig. 9, and redefining as shown in that figure, one has for a current wave of unit amplitude $$\left(\frac{di}{dt}\right)_{t=0}=\frac{1}{\epsilon/2}=\frac{4n}{\delta}, \text{ or } \epsilon/\delta=\frac{1}{2}n$$

whence the fundamental period of the sawtooth wave, which is $\delta-\epsilon$, is shown to be $$\delta\left(1-\frac{1}{2n}\right)$$

and the fundamental frequency of this wave is seen to be $$\frac{1}{\delta\left(1-\frac{1}{2n}\right)} \text{ or } \frac{1}{\delta}\cdot\frac{2n}{2n-1}$$

It is to be expected that for curves using "smooth" approximations to a square wave other than the curve having parabolic arcs as in Fig. 9, the initial slope may have a slightly different relation to $\epsilon$, $\delta$ and $n$. The variation is not likely to be great so that the formula $$\frac{2n}{2n-1}\cdot\frac{1}{\delta}$$

for the fundamental antiresonant frequencies of networks of the form shown in Fig. 6 may be treated as substantially representative of the results to be obtained by any practical approximation to the square wave by means of non-discontinuous and relatively smooth function. In practice minor variations from the values of anti-resonant frequencies predicted by the formula can be tolerated. The relation $$\frac{2n+1}{2n}\cdot\frac{1}{\delta}$$

for instance, seems to produce equally good results in practice. For reasonably large $n$, of course, $$\frac{2n+1}{2n}$$

is practically the same as $$\frac{2n}{2n-1}$$

As another example of variations to be expected, calculation of the antiresonant frequencies given by Table I will show that the higher anti-resonant frequencies are slightly less than the corresponding multiples of $$\frac{2n}{2n-1}\cdot\frac{1}{\delta}$$

These frequencies are derived from the calculations outlined in connection with Fig. 9, so that the variations from the formula are really but a measure of the accuracy of the calculations and the method of computation used. A network such as that given by Table I will provide a substantially square pulse with practically no ripples and without the characteristic overshoot of certain other types of networks, when used in a circuit such as that of Fig. 1.

From the above considerations it is seen that the ratio of the anti-resonant frequencies of a network designed by this method to the arithmetic means between successive resonant frequencies of such network may be treated as being approximately equal to $$\frac{2n}{2n-1}$$

The said arithmetic means are the anti-resonant frequencies of a lossless transmission line which the network simulates. The reactance function of such networks will, therefore, appear substantially as is shown in Fig. 7, which illustrates the case of an eight-component network. In Fig. 7 the resonant frequencies (where the reactance passes through zero) are indicated by small circles and the anti-resonant frequencies (which are poles of the reactance function) are indicated by crosses.

It is known that a reactance function is completely determined by the location of its poles and zeros, except for one additional parameter, which in this case corresponds to the factor necessary for setting the desired characteristic impedance of the network and the desired pulse length. Thus the relative magnitude of the inductances and capacitances may be completely determined from the desired resonant and anti-resonant frequencies. From the above-derived relation between the resonant and anti-resonant frequencies, illustrated for the case of an eight-component network in Fig. 7, the elements of the network may then be derived directly from these frequencies, instead of from one set of these frequencies and a computation of the amplitude corresponding thereto.

It will be seen from Fig. 7 that the networks, although they do simulate, in their response in a circuit such as Fig. 1, the reactive characteristics of a lossless transmission line which has some critical frequencies the same as the corresponding critical frequencies of the network, possess reactance characteristics which differ substantially from those of the transmission line simulated, even within the range of the first $n$ harmonics of the frequency $$f=\frac{1}{2\delta}$$

Speaking loosely, it may be said that the deviation of the network reactance characteristic from the transmission reactance characteristic at low frequency to some extent makes up for the failure of the network to include the higher resonant frequencies present in the reactance characteristic of the transmission line. Thus a good approximation of the desired rectangular pulse may be obtained with a relatively small number of resonant frequencies (and consequently with a relatively small number of components).

The zeros of a reactance function define one set of "critical frequencies" of the corresponding network and the poles of the reactance function define the other set of "critical frequencies" of such network. The term "critical frequencies" is commonly used in connection with reactive networks to denote collectively the frequencies of resonance and anti-resonance (zero and "infinite" reactance).

In the present discussion, the matter of network losses has been neglected and attention has been focused upon the reactance characteristics alone, because it is possible to produce inductances and capacitances having sufficiently low losses so that the behavior of the network may for all practical purposes be considered as purely reactive. The taking account of network losses, if desired in special cases, for such losses as may occur, does not present any particularly difficult problem, since the relative magnitude of such losses may be kept quite small.

When well-known network equivalence theorems are used, various other forms of networks may be found which will be the equivalents of the form of network shown in Fig. 6 and constituted in accordance with this invention as above described, once the values of the components of the network of Fig. 6 have been obtained in accordance with one of the above-outlined procedures. Because of the equivalence of these forms of networks, they may all be represented by a reactance function of the general form of Fig. 7. In particular it is to be noted that these various equivalent networks will have identical resonant and anti-resonant frequencies.

The procedure for obtaining the constants of one of these forms of network for equivalence with a network of one of the other forms of which the constants are given is explained in well-known texts, such as T. E. Shea, Transmission Networks and Wave Filters (D. Van Nostrand Co., Inc., New York, 1929), chapter V, p. 124, or E. A. Guillemin, "Communication Networks," vol. II (John Wiley and Sons Inc., New York, 1935), chapter V, p. 184.

Figure 15:
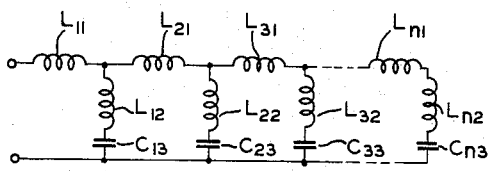
Figs. 15 and 16 are schematic diagrams of the form of network which employs capacitances of equal value.

One of these equivalent networks is shown in Fig. 15 the values of the inductances and capacitances being given in Table II for conditions corresponding to those for which Table I was calculated. It is to be noted that the inductances $L_{12}$, $L_{22}$, $L_{32}$, and $L_{42}$ are all negative. In fact the inductance $L_{m2}$ is likewise negative but since it can readily be combined with $L_{m1}$, these two inductances are combined in the tables and a single value for a single inductance $L_{m12}$ to replace these two inductances is given in Table II ($n$ in this case being 5). The effect of negative inductances in series with condensers $C_{13}$, $C_{23}$ and so on can be obtained in practice by providing mutual inductance resulting from the coupling of coils connected in the position of $L_{11}$, $L_{21}$, $L_{31}$ and so on. It is to be noted in this connection that the values of inductance and capacitance given in Table I relating to Fig. 6 hold only for absence of inductive coupling between the inductances, modification of the values given being necessary when the network is modified to include such couping.

*Table II*
(Corresponding to Fig. 15)

| $L_{11}$ | $L_{21}$ | $L_{31}$ | $L_{41}$ | $L_{(51+52)}$ |
|---|---|---|---|---|
| 0.2872 | 0.2857 | 0.2854 | 0.2846 | 0.2770 |
| $L_{12}$ | $L_{22}$ | $L_{32}$ | $L_{42}$ | |
| −0.03564 | −0.03833 | −0.03715 | −0.02410 | |
| $C_{13}$ | $C_{23}$ | $C_{33}$ | $C_{43}$ | $C_{53}$ |
| 0.286 | 0.286 | 0.286 | 0.286 | 0.286 |

The reactance function for the network of Fig. 15 may be denoted by $Z(\lambda)$, having zeros at values of $\omega$ (angular frequency) equal to $\omega_1, \omega_3 \ldots \omega_{2n-1}$ and having poles at 0 and at infinity and at values at $\omega$ equal to $\omega_2, \omega_4 \ldots \omega_{2n-2}$, the function has the polynomial form:

$$Z(\lambda) = \frac{\alpha_{2n}\lambda^{2n} + \alpha_{2n-2}\lambda^{2n-2} + \ldots + \alpha_2\lambda^2 + \alpha_0}{\beta_{2n-1}\lambda^{2n-1} + \beta_{2n-3}\lambda^{2n-3} + \ldots + \beta_3\lambda^3 + \beta_1\lambda} \quad (8)$$

in which $\lambda = j\omega$. The function also has the partial fraction expansion:

$$Z(\lambda) = \frac{k_0}{\lambda} + \frac{2k_2\lambda}{\lambda^2 - \lambda_2^2} + \frac{2k_4\lambda}{\lambda^2 - \lambda_4^2} + \ldots + \frac{2k_{2n-2}\lambda}{\lambda^2 - \lambda_{2n-2}^2} + k_{2n}\lambda \quad (9)$$

in which $\lambda_2, \lambda_4 \ldots \lambda_{2n-2}$ are the roots of the denominator polynominal in Equation 8. In particular, the term $k_{2n}\lambda$ in Equation 9 represents the pole at $\lambda = \infty$.

From Equation 9 it is clear that $$k_{2n} = \frac{\alpha_{2n}}{\beta_{2n-1}} \quad (10)$$

The initial step in the procedure is to remove a series inductance, but since it is desired to control the value of capacitance which is encountered in the succeeding step in the cycle of operations, it is clear that the value of the inductance to be removed in the first step cannot be equal to $k_{2n}$ but remains for the moment undetermined. If this is denoted by $L_{11}$, one encounters, after its removal, the remainder function $$Z(\lambda) = Z_1(\lambda) - L_{11}\lambda \quad (11)$$

which (in view of the fact that the numerator of $Z_1(\lambda)$ is a polynomial in $\lambda^2$) has a zero at the frequency $$\lambda^2 = \lambda_k^2$$

defined by $$Z(\lambda_k) - L_{11}\lambda_k = 0 \quad (12)$$

whence $$L_{11} = \frac{Z(\lambda_k)}{\lambda_k} \quad (13)$$

and $$Z_1(\lambda) = Z(\lambda) - \frac{Z(\lambda_k)}{\lambda_k}\lambda \quad (14)$$

The susceptance function $$Y_1(\lambda) = \frac{1}{Z_1(\lambda)} \quad (15)$$

evidently has a pole at the frequency $$\lambda^2 = \lambda_k^2$$

and hence admits of the representation $$Y_1(\lambda) = \frac{2a\lambda}{\lambda^2 - \lambda_k^2} + Y_2(\lambda) \quad (16)$$

According to established mathematical theory $$\frac{1}{a} = \left(\frac{dZ_1}{d\lambda}\right)_{\lambda=\lambda_k} = \left(\frac{dZ}{d\lambda} - \frac{Z}{\lambda}\right)_{\lambda=\lambda_k} \lambda_k \left[\frac{d}{d\lambda}\left(\frac{Z}{\lambda}\right)\right]_{\lambda=\lambda_k} \quad (17)$$

The first term of Equation 16 represents the susceptance of an inductance $L_k$ and a capacitance $C_k$ in series, with $$L_k = \frac{1}{2a}, \text{ and } L_k C_k = \frac{1}{\lambda_k^2} \quad (18)$$

Equations 17 and 18 yield $$\frac{1}{C_k} = S_k = \frac{-\lambda_k^2}{2a} = -\frac{\lambda_k^2}{2}\left[\frac{d}{d\lambda}\left(\frac{Z}{\lambda}\right)\right]_{\lambda=\lambda_k} \quad (19)$$

$S_k$ is the elastance corresponding to the capacitance $C_k$. Using Equation 9 for the analytic representation of $Z(\lambda)$, one finds after working out the differentiation indicated in (19)

$$S_k = \left[k_0 + \frac{2k_2\lambda^4}{(\lambda^2-\lambda_2^2)^2} + \frac{2k_4\lambda^4}{(\lambda^2-\lambda_4^2)^2} + \ldots + \frac{2k_{2n-2}\lambda^4}{(\lambda^2-\lambda_{2n-2}^2)^2}\right]_{\lambda=\lambda_k} \quad (20)$$

The expression appearing in the square bracket is a function of $\lambda^2$ which for convenience may be denoted by $S(\lambda^2)$. It should be observed that $$\lambda_2^2 = -\omega_2^2, \lambda_4^2 = -\omega_4^2, \text{ etc.,}$$

in which $\omega_2, \omega_4, \ldots$ are the finite frequencies at which the original function $Z(\lambda)$ has poles. Hence one may write $$S(\lambda^2) = k_0 + \frac{2k_2\lambda^4}{(\lambda^2+\omega_2^2)^2} + \frac{2k_4\lambda^4}{(\lambda^2+\omega_4^2)^2} + \ldots + \frac{2k_{2n-2}\lambda^4}{(\lambda^2+\omega_{2n-2}^2)^2} \quad (21)$$

Since $C_k$ is supposed to have the value $C_0/n$, i. e. $S_k$ should equal $n/C_0$, one may use Equation 21 to find that value of $\lambda^2$ for which $S(\lambda^2)$ equals the prescribed value $S_k$. This value of $\lambda^2$ is $$\lambda_k^2$$

Once this is known the value of $L_{11}$ follows from Equation 13, and $L_k$ from Equation 17 and 18, so that the first cycle in the contemplated procedure will be completed.

For positive real values of $\lambda^2$, the function $S(\lambda^2)$ is seen to increase continuously from the value $k_0$ at $\lambda^2 = 0$ to the value $$k_0 + 2k_2 + 2k_4 + \ldots + 2k_{2n-2}$$

at $\lambda^2 = \infty$. Hence if Equation 21 is plotted against $\lambda^2$, the value of $$\lambda^2 = \lambda_k^2$$

for which $S(\lambda^2)$ equals $S_k$ may graphically be found. Since $$\lambda_k^2 = -\omega_k^2$$

the corresponding radian frequency $\omega_K$ turns out to be imaginary. This means that the value of $L_k$ becomes negative, but $L_{11}$ is positive. In the complete structure of Fig. 19 the series inductances $L_{11}, L_{21}$, etc. are all positive, while the shunt inductances $L_{12}, L_{22}$, etc. are negative. These negative inductances may be realized physically in the form of mutual inductances as shown in Fig. 16.

It is understood that the remainder $Y_2(\lambda)$ appearing in Equation 16 when inverted is a reactance function like $Z(\lambda)$ but with one less zero and pole. The same procedure is applied to this inverted remainder as was applied to $Z(\lambda)$, and this is continued until all zeros and poles are removed.

Figure 16:
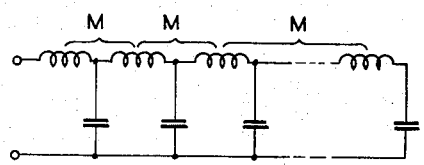

Fig. 16 illustrates the manner in which a network of the form shown in Fig. 15 may be physically realized, the brackets indicating the presence of mutual inductance resulting from coupling. It will be noted that the network of Fig. 15, as shown in Table II, makes possible the use of condensers of equal capacitance. The inductance values of the coils are obtained from the values given in Table II by the simple condition that the inductance around each mesh of the network in Fig. 16 must be the same as the inductance around the corresponding mesh of the network in Fig. 15.

The inductances shown to be coupled may in some cases all be wound in the form of a continuous solenoid, a method of construction which is advantageous from a manufacturing point of view. However, for networks of more than two sections it would in general be necessary to divide the solenoid into portions of different diameter in order to obtain the proper amount of mutual inductance. This procedure is undesirable from both design and manufacturing points of view.

It will be noted from Table II that the component coil inductances, except for those at each end, required for the network of Fig. 16 do not differ greatly from each other in magnitude and that the mutual inductances between coils are likewise of the same order of magnitude. This indicates that another substantially equivalent network may be obtained in which all coils except the two end ones are identical and have the same mutual inductance between successive pairs; all the coils of such a network may be wound as a single continuous-wound tapped solenoid of uniform diameter, a form of inductance that is particularly favorable for manufacture. This approximation causes the antiresonant points of networks built in this manner to depart slightly from the theoretically correct points. As a result of these departures, the oscillations on the top of the pulse are not as uniform as with a network built according to the previous invention; however, the departures from uniformity are of negligible consequence with regard to the performance of the circuit in which the network is used.

This form of network, the present invention, is illustrated in Fig. 17. The taps on the solenoidal inductance are so spaced that all the resulting divisions of the solenoid except the two-terminal portions have an identical number of turns and an identical length, so that they will have identical inductances, of a value L. The capacitors are all of the same magnitude, having a value C. The values of L and C, as well as the values of the input coil (L' in Fig. 17) and of the terminal section (L'' in Fig. 17), may be obtained from the values for an equivalent network of the form shown in Fig. 16; the values of C, L' and L'' will be the same, and the values of L and the mutual inductances will be averages of the corresponding values for the network of Fig. 16.

The following approximate method of designing networks according to the present invention may be used. In the consideration of this method, it should first be noted that the pulse length as defined in the foregoing is not the pulse length in which one is usually interested. The latter is the width of the pulse at 70.7% of the peak amplitude, as measured on a pure resistance load; it may easily be shown that this pulse width should be given by $$\delta = 2\sqrt{\Sigma L \times \Sigma C}$$

where $\Sigma L$ is the inductance of the entire solenoid and $\Sigma C$ is the sum of the capacitances of all the capacitor elements. It may further be shown that the values of $\Sigma L$ and $\Sigma C$ required for a pulse length $\delta$ (as defined in this manner) and impedance Z are given by the relations $\Sigma L = \delta Z/2$ and $\Sigma C = \delta/2Z$. It has been found that for networks of four or more sections the proper value for the coefficient of coupling between adjacent portions of the solenoid is usually about 0.15 (i. e., the value of $L_1$ in Fig. 17 is about 2.3L) the proper value of L' is usually about 1.1L (although it may vary between 1.1L and 1.5L), and the proper value of L'' is usually about 1.2L (although it may vary between 1.1L and 1.5L). In order to design a network with the desired number of sections and for the desired pulse length $\delta$ and impedance Z, the values of capacitance (given by $\delta/2nZ$) and the value of the total inductance of the solenoid $\Sigma L$ (given by $\delta Z/2$) are calculated. Then the values of L (given approximately by $\Sigma L/1.3n$), L' and L'' are calculated. Finally the proper form diameter, wire size and number of turns are chosen to give the proper values of L and $L_1$; this may be done with the help of well-known tables and "lightening calculators." Further modifications of a minor sort may then be made on a purely experimental basis, keeping in mind that the inductance L' tends to control the rate of rise, or overshoot, at the leading edge of the pulse, and that the inductance L'' tends to control wiggles on the top of the pulse near the trailing edge. L'' appears to be more critical of adjustment than L'.

This semi-experimental design using the principles of the present invention has the particular advantage that it provides a check on stray mutual inductances not provided for in the straightforward design procedure but which may nevertheless creep into the construction.

Figs. 17, 18, 19, 20, and 21 illustrate methods of physical construction for the network shown in Fig. 17 which may be used instead of the conventional construction of a bank of condensers of the usual type lined up alongside a solenoid. The arrangements shown in Figs. 18 and 20 make use of condensers formed by cylindrical silver bands mounted on a tubular piece of dielectric material.

The dielectric cylinder is shown at 90. The surface of the cylinder 90 is provided with silvered bands both on the outside as at 91 and on the inside as at 92. These silvered bands may be formed by sputtering silver on the entire surface of the dielectric cylinder and then removing the silver coating in strips to divide the silvered surface into discrete bands thus forming condenser plates. If desired the silver surfaces may be electroplated and polished. One of the surfaces, either inside or outside, whichever surface is connected to the terminal B of Fig. 17, may be continuous, since in the circuit of Fig. 17 all the condensers have one terminal connected to B. In Fig. 18 the inner silvered surface is provided in continuous form, whereas in Fig. 20 the outer silvered surface 91 is continuous while the silvered portions of the inner surface 92 are separate. Suitable connecting wires may be silversoldered to the silvered surface, as indicated generally in both figures. In Fig. 18 the solenoid 93 is shown located outside of a parallel to the cylinder 90. In Fig. 20 the solenoid 93 is located inside the dielectric cylinder 90. The structure of Fig. 20 is particularly compact and has the further advantage that the outside silvered surface is all at the same potential, which in some circuits may be arranged to be ground potential. Suitable insulating supports may be provided in the structure of Fig. 20 for maintaining the alignment of the elements for purposes of insulation.

We claim:

1. An electrical network having substantially the characteristics of an open circuited lossless transmission line comprising a solenoid inductance coil, a bank of equal capacitance condensers connected together at one plate of each condenser, the other plate of each condenser being connected to said coil at spaced points therealong including one end thereby dividing the coil into a plurality of equal sections and two terminal sections, said equal sections being wound to make the combined inductance of any two adjacent equal sections substantially 2.3 times the inductance of a single equal section, and said two terminal sections being wound to have an inductance between 1.1 and 1.5 times the inductance of said single equal section.

2. A two terminal network for simulating the reactive characteristics of a uniform transmission line comprising, a single layer continuous solenoid inductance coil, a bank of equal value capacitors, means for connecting one of said network terminals through said bank of capacitors to substantially evenly spaced points along said coil and one end thereof, means connecting the second terminal of said network to the open end of said coil, said solenoid coil being so wound upon a form of uniform diameter that the self-inductance of each terminal section of the network so formed has a value between 1.1 and 1.5 of the self-inductance of the remaining sections of equal value.

JOSEPH R. PERKINS, Jr.
STANLEY R. AMES.

References Cited in the file of this patent

UNITED STATES PATENTS

| Number | Name | Date |
|---|---|---|
| 1,576,459 | Pierce | Mar. 9, 1926 |
| 2,226,728 | Lalande et al. | Dec. 31, 1940 |
| 2,299,571 | Dome | Oct. 20, 1942 |
| 2,416,297 | Finch | Feb. 25, 1947 |
| 2,416,683 | Finch | Mar. 4, 1947 |
| 2,461,321 | Guillemin | Feb. 8, 1949 |

OTHER REFERENCES

Publication, "Electric Oscillations and Electric Waves," by Pierce, published by McGraw-Hill in 1920; pages 298–303 of interest. Copy in Library.